United States Patent
Kuwano

[11] Patent Number: 6,086,144
[45] Date of Patent: Jul. 11, 2000

[54] DRAIN STRUCTURE OF VEHICLE

[75] Inventor: Yasunari Kuwano, Kanagawa-ken, Japan

[73] Assignee: Nissan Motor Co., Ltd., Kanagawa-ken, Japan

[21] Appl. No.: 09/285,045

[22] Filed: Apr. 1, 1999

[30] Foreign Application Priority Data

Apr. 2, 1998 [JP] Japan .................. 10-089128

[51] Int. Cl.⁷ .................................................. B60R 27/00
[52] U.S. Cl. ........................................... 296/192; 296/208
[58] Field of Search .................................. 296/192, 194, 296/203.02, 208

[56] References Cited

U.S. PATENT DOCUMENTS

| | | | |
|---|---|---|---|
| 4,270,793 | 6/1981 | Harasaki et al. | 296/192 |
| 4,332,187 | 6/1982 | Imai et al. | 296/208 |
| 4,601,510 | 7/1986 | Schoppel et al. | 296/208 |
| 5,145,457 | 9/1992 | Tangiaito et al. | 296/192 |

FOREIGN PATENT DOCUMENTS

| | | | |
|---|---|---|---|
| 2-108636 | 8/1990 | Japan . | |
| 404085183 | 3/1992 | Japan | 296/208 |

*Primary Examiner*—Gary C. Hoge
*Attorney, Agent, or Firm*—McDermott, Will & Emery

[57] ABSTRACT

A disclosed drain structure of a vehicle is provided with a cowl top panel, a dam portion provided to a front end of the cowl top panel, a framework forming member connected to a side end of the cowl top panel, an opening provided to an upper surface of the framework forming member such as to communicate with the dam portion, and a space portion defined by use of the framework forming member and having a closed section. Here, liquid introduced onto the upper surface of the cowl top panel flows through the dam portion and the opening sequentially, and reaches the space portion.

20 Claims, 3 Drawing Sheets

DRAIN STRUCTURE OF VEHICLE

BACKGROUND OF THE INVENTION

The present invention relates to a drain structure of a vehicle, and more particularly, to a drain structure of a body of a vehicle to which rainwater or the like is prone to be introduced.

Japanese Utility Model Registration Application Laid-open No. H2-108636 discloses a structure for leading rainwater introduced to a so-called cowl box toward a dash side panel through a drain portion disposed between a hood ridge reinforce and the dash side panel, and dropping the rainwater.

SUMMARY OF THE INVENTION

However, if the structure for leading the rainwater to the dash side panel and dropping the rainwater is employed, and when the rainwater reaching around a front door hinge freezes at a low temperature, the opening and closing movements of the front door may be hindered.

It seems possible to weld another drain member at an appropriate position of the dash side panel in order to once collect the rainwater drained from the drain portion provided between the hood ridge reinforce and the dash side panel and then, to let the rainwater drop from the drain member such as to separate the rainwater from the front door hinge.

However, according to such a structure to provide the drain member, the number of parts is increased and the design is complicated, the weight and the cost are increased, and the assembling operation in the mass production line is complicated.

Therefore, a drain structure is desired in which liquid such as rainwater introduced to an upper wall surface or the like of the cowl box supporting a front window glass of a vehicle can drain in a manner that does not trouble the movement of a movable part such as the front door, without using the other part such as the drain member.

The present invention has been achieved in view of such circumstances, and it is an object of the present invention to provide a drain structure of a body of a vehicle to which rainwater or the like is prone to be introduced, without providing the other member in such a manner that it does not trouble the movement of the structural part of the vehicle.

A drain structure of a vehicle of the present invention is provided with a cowl top panel, a dam portion provided to a front end of the cowl top panel, a framework forming member connected to a side end of the cowl top panel, an opening provided to an upper surface of the framework forming member such as to communicate with the dam portion, and a space portion defined by use of the framework forming member and having a closed section. Here, liquid introduced onto the upper surface of the cowl top panel flows through the dam portion and the opening sequentially, and reaches the space portion.

In other word, a drain structure of a vehicle of the invention comprises supporting means supporting a lower end of a front window glass of the vehicle, preventing means provided to the supporting means and preventing liquid from moving forward, and communicating means bringing the liquid into contact with a space portion defined by use of a frame work forming member of a body of the vehicle and having a closed section when the liquid, which is prevented from moving forward by the preventing means, moves sideways. The liquid introduced into the drain structure of the vehicle flows through the preventing means and the communicating means sequentially, and reaches the space portion.

DETAILED DESCRIPTION OF THE PREFERRED EMBODIMENT

An embodiment of the present invention will be explained in detail with reference to the drawings below.

Figure 1:
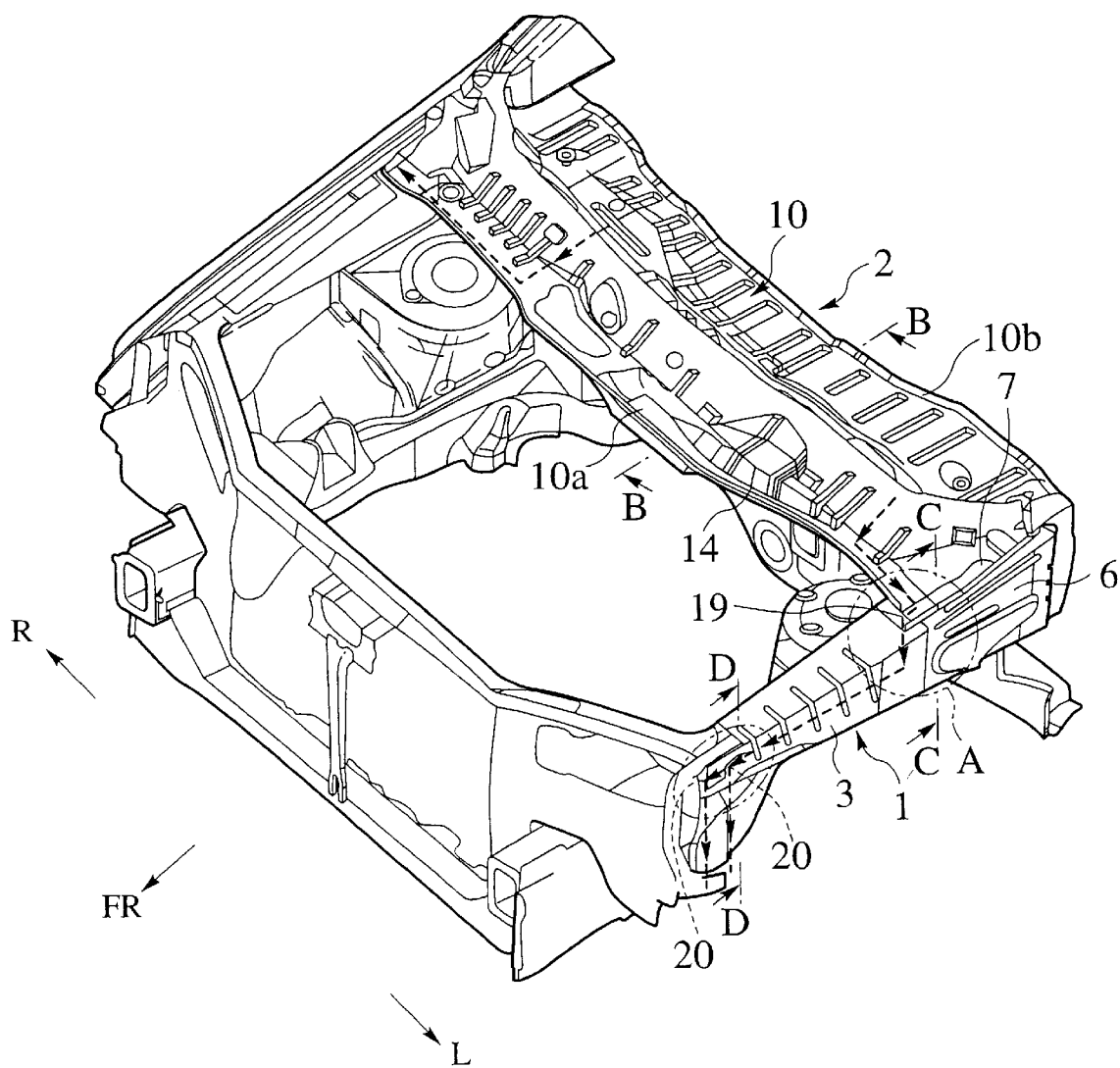
FIG. 1 is a schematic perspective view of a drain structure of a front body of a vehicle according to an embodiment of the present invention.
Figure 4:
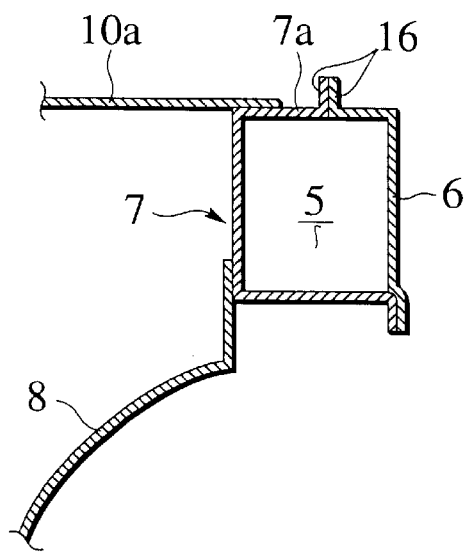
FIG. 4 is a sectional view taken along the line C—C in FIG. 1.

In FIG. 1, FR represents the front direction of a body of a vehicle, 1 represents a hood ridge reinforce as a framework forming member, i.e., a body upper side edge framework member continuously connected to a side end of a cowl box 2 which is a box member. The hood ridge reinforce 1 is formed such as to be divided into front and rear hood ridge reinforces 3 and 6. The front hood ridge reinforce 3 forms a space portion 5 having a closed section between the front hood ridge reinforce 3 itself and a hood ridge upper panel 4, and the rear hood ridge reinforce 6 forms a space portion 5 having a closed section between the rear hood ridge reinforce 6 itself and a cowl top side panel 7 (see FIGS. 4 and 5). That is, the front half portion of the hood ridge reinforce 1 forms the body upper side edge framework member, and the rear half portion of the hood ridge reinforce 1 forms the body upper side edge framework member together with the cowl top side panel 7. An upper end of a hood ridge lower panel 8 is jointed to the hood ridge upper panel 4 and the cowl top side panel 7 such as to extend over these two panels 4 and 7.

Figure 3:
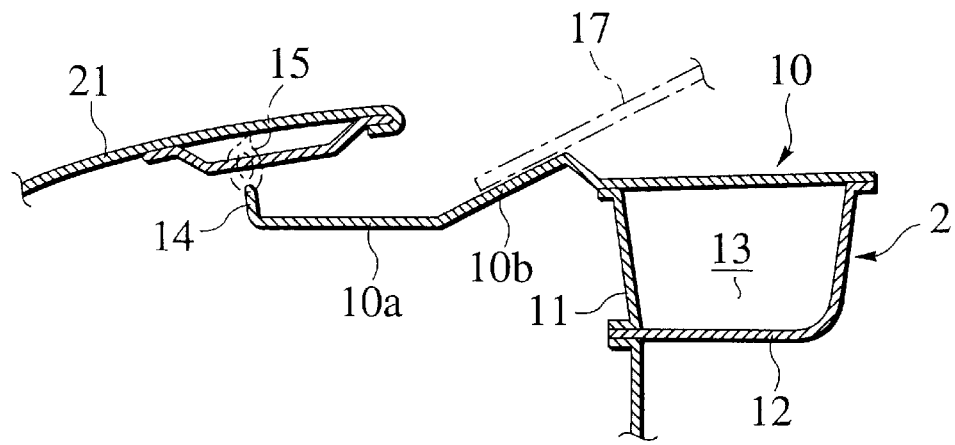
FIG. 3 is a sectional view taken along the line B—B in FIG. 1.

As shown in FIG. 3, the cowl box 2 forms a space portion 13 having a closed section in corporation with a cowl top panel 10, a dash upper panel 11 and a cowl lower panel 12, and the space portion 13 is disposed so as to cross the space portion 5 at the side of the hood ridge reinforce 1 substantially at a right angle with the space portion 5. A front end of the cowl top panel 10 is extended forward beyond the dash upper panel 11, and a tip end of the extended portion 10a of the cowl top panel 10 is bent upward such as to form a flange 14 as a dam portion. A side edge of the extended portion 10a is jointed to an upper wall 7a of the cowl top side panel 7. A seal member 15 is attached to the flange 14 of the cowl top panel 10 such that the seal member 15 is tightly contacted with a rear end of a front hood 21. The extended portion 10a of the cowl top panel 10 is formed with an inclining portion 10b, and a lower end of the front window glass 17 is adhered and fixed to the inclining portion 10b.

Figure 2:
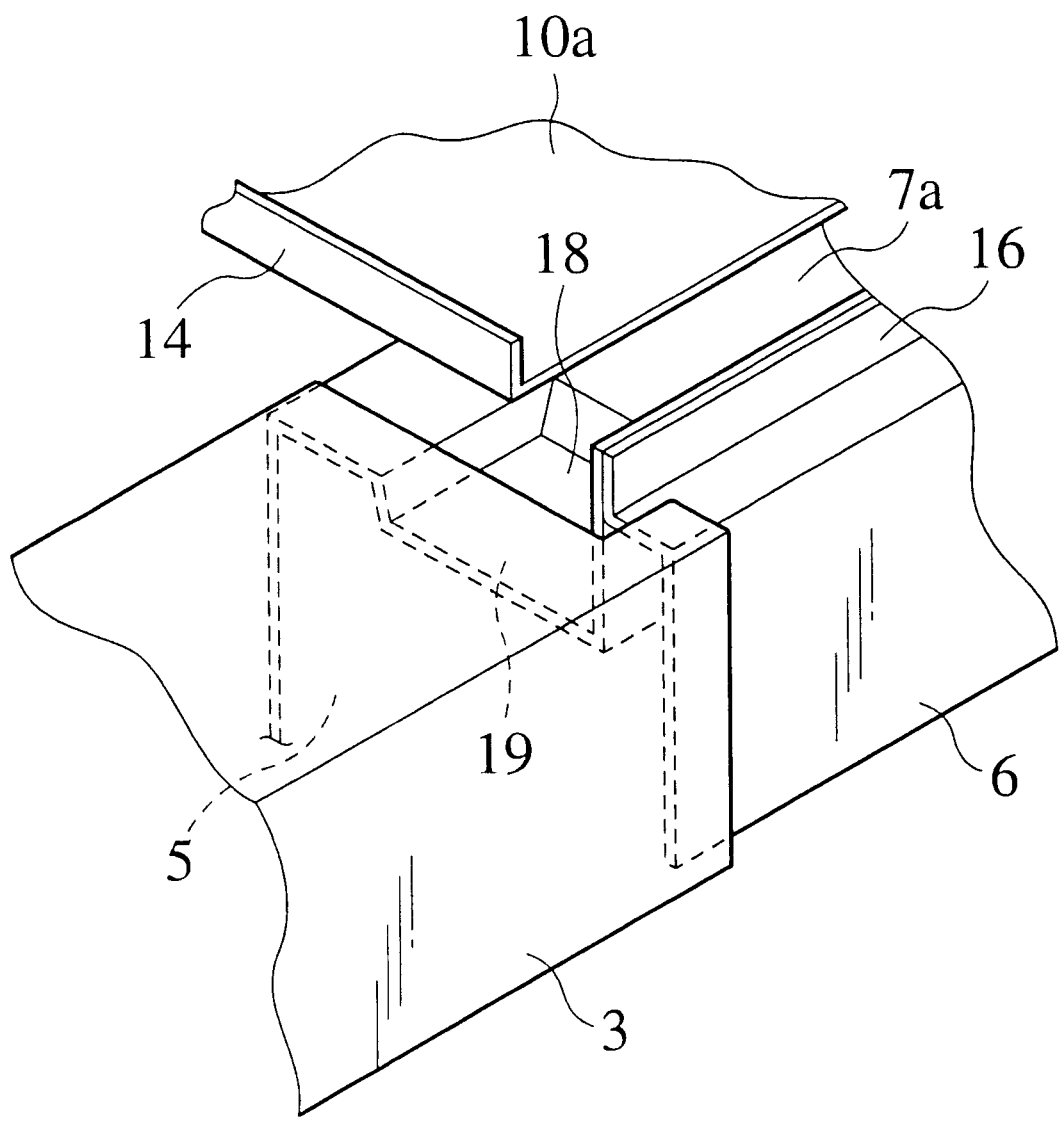
FIG. 2 is an enlarged perspective view of a portion A in FIG. 1.
Figure 5:
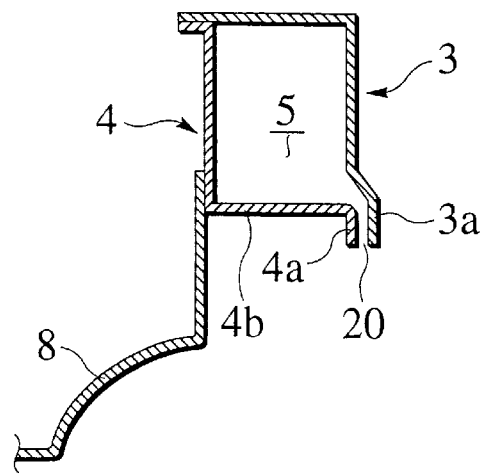
FIG. 5 is a sectional view taken along the line D—D in FIG. 1.

Upper end joint flanges 16, 16 respectively of the rear hood ridge reinforce 6 and the cowl top side panel 7 are extended in the longitudinal direction(forward/rearward direction) of the body at the side of the cowl box 2, and its rear end is located rearward of the flange 14 of the cowl top panel 10 and its front end is extended forward beyond the flange 14 of the cowl top panel 10. The upper end joint flange 16 of the cowl top side panel 7 is also provided as a guide portion. As shown in FIG. 2, a recess 18 formed using a step portion is formed on the upper wall 7a of the cowl top side panel 7 at a position extending from a front end of the upper wall 7a to a slightly rear portion of the flange 14 of the cowl top panel 10, and an opening 19 is formed at a gap portion of a join position between the cowl top side panel 7 and the front hood ridge reinforce 3. Further, as shown in FIGS. 1 and 5, a lower end joint flange 3a of the front hood ridge reinforce 3 is partially offset from a lower end joint flange 4a of the hood ridge upper panel 4, and a pair of front and rear drain openings 20 are formed in front end portions of the space portion 5.

Since the present embodiment has the above-described structure, liquid such as rainwater flowing down the front window glass 17 flows on the extended portion 10a sideways the body while being dammed by the flange 14 of the cowl top panel 10. When the liquid reaches the upper wall 7a of the cowl top side panel 7, the liquid is dammed by the flange 14 and is guided by the upper end joint flange 16 of the cowl top side panel 7 and flows into the recess 18. And then the liquid drops from the opening 19 into the space portion 5. The dropped liquid flows forward on a bottom wall 4b of the hood ridge upper panel 4, and drops outward from the front and rear drain openings 20.

According to the present embodiment, since liquid such as rainwater flows into the hood ridge reinforce 1 at the right and left sides of the cowl top panel 10, it is possible to omit a drain member which is conventionally provided on the dash side panel, and therefore the number of parts and the number of assembling steps are reduced, which is advantageous in terms of the costs. Since the conventionally provided flanges are utilized as the flanges 14 and 16 for damming and guiding the liquid such as rainwater, the costs can further be reduced.

Further, since the rainwater flowing out from the cowl top panel 10 is dammed and guided by the upper end joint flange 16 of the cowl top side panel 7 and flows into the opening 19, the rainwater dose not flow on and drop from the rear hood ridge reinforce 6.

Furthermore, since the cowl top side panel 7 is formed with the recess 18, and the joint portion between the front hood ridge reinforce 3 and the cowl top side panel 7 is formed with the opening 19, the number of drilling steps can be reduced, the opening 19 can not easily be seen at the time of maintenance of the engine and thus, an outward appearance of the body in such a case is enhanced.

Although the present invention has been described based on the vehicle of a type in which the cowl top panel 10 is extended forward and the lower end of the front window glass 17 is supported by the panel 10, the present invention should not be limited to the vehicle of this type only, and the invention is also applicable to a vehicle of a type in which the cowl top panel is not extended. The invention is also applicable to a vehicle in which the hood ridge reinforce 1 is not divided in front and rear portions but is integrally formed.

The entire contents of a Patent Application No. TOKUGANHEI 10-89128, with a filling date of Apr. 2, 1998 in Japan, are hereby incorporated by reference.

Although the invention has been described above by reference to a certain embodiment of the invention, the invention is not limited to the embodiment described above. Modifications and variations of the embodiment described above will occur to those skilled in the art, in light of the teachings. The scope of the invention is defined with reference to the following claims.

What is claimed is:

1. A drain structure of a vehicle, comprising:
   a cowl top panel;
   a dam portion provided at a front end of said cowl top panel said dam portion comprising a flange extending upward and formed on a front end of said cowl top panel;
   a framework forming member connected to a side end of said cowl top panel;
   an opening provided in an upper surface of said framework forming member such as to communicate with said dam portion; and
   a space portion defined by said framework forming member and having a closed section,
   wherein liquid an upper surface of said cowl top panel flows sequentially through said dam portion and said opening, and reaches said space portion.

2. A drain structure of a vehicle according to claim 1, wherein a guide portion guiding said liquid to said opening in the longitudinal direction thereof is provided at the side of said cowl top panel.

3. A drain structure of a vehicle according to claim 2, wherein a front end of said guide portion is located forward of said dam portion.

4. A drain structure of a vehicle according to claim 2, wherein a front end of said guide portion communicates with said opening.

5. A drain structure of a vehicle according to claim 2, wherein a rear end of said guide portion is located rearward of said dam portion.

6. A drain structure of a vehicle according to claim 2, wherein said guide portion is an upward extending flange formed by use of a cowl top side panel forming a part of said framework forming member.

7. A drain structure of a vehicle according to claim 1, wherein said opening is a gap portion formed between a cowl top side panel, forming a part of said framework forming member, and a hood ridge reinforce in front of said cowl top side panel.

8. A drain structure of a vehicle according to claim 1, wherein said opening is located forward of said dam portion.

9. A drain structure of a vehicle according to claim 1, wherein a step portion having a downwardly changing surface is formed between said dam portion and said opening.

10. A drain structure of a vehicle according to claim 1, wherein said liquid introduced into said space portion is guided forward within said space portion, and is discharged out from said space portion.

11. A drain structure of a vehicle according to claim 1, wherein said space portion is further defined by use of a cowl top side panel forming a part of said framework forming member.

12. A drain structure of a vehicle comprising:
   a cowl top panel;
   a dam portion provided at a front end of said cowl top panel said dam portion comprising a flange extending upward and formed on a front end of said cowl top panel;
   a framework forming member connected to a side end of said cowl top panel;
   an opening provided in an upper surface of said framework forming member such as to communicate with said dam portion; and
   a space portion defined by said framework forming member and having a closed section,
   wherein liquid on an upper surface of said cowl top panel flows sequentially through said dam portion and said opening, and reaches said space portion;

wherein a step portion having a downwardly changing surface is formed between said dam portion and said opening; and wherein said step portion is formed such that an upper surface of a cowl top side panel forming a part of said framework forming member changes downwardly, thereby forming a recess portion.

13. A drain structure of a vehicle according to claim 12, wherein a front end of said recess portion is located forward of said dam portion.

14. A drain structure of a vehicle according to claim 12, wherein a front end of said recess communicates with said opening.

15. A drain structure of a vehicle according to claim 12, wherein a rear end of said recess is located rearward of said dam portion.

16. A drain structure of a vehicle according to claim 12, wherein a guide portion guiding said liquid to said opening is provided at a side end of said recess connecting to said guide portion.

17. A drain structure of a vehicle, comprising:

supporting means for supporting a lower end of a front window glass of said vehicle;

preventing means in the form of a flange which is provided on said supporting means for preventing liquid from moving forward and for acting as a dam; and communicating means for moving liquids which is prevented from moving forward by said preventing means, sideways and for transferring the liquid into a space portion in a framework forming member of a body of the vehicle having a closed section, wherein the liquid which is introduced into said drain structure flows sequentially via said preventing means and said communicating means into the space portion.

18. A drain structure in a front body of a vehicle, comprising:

a cowl top panel supporting a front windshield; and a pair of hood ridge reinforcements connected to the respective ends of said cowl top panel;

wherein said cowl top panel has a dam portion at a front end thereof which guides water from the front windshield, and wherein each of said pair of hood ridge reinforcements comprises:

a rear portion connected to said cowl top panel and a front portion extending into contact with said rear portion and having a closed section therein;

a downwardly extending recess portion formed in said rear portion at an end portion of said dam portion; and a hole formed at a portion connecting to said recess portion to said front portion; and wherein water from the dam portion flows into the closed section through the recess portion and said hole, and drains at a forward portion of the vehicle.

19. A drain structure in a front body of a vehicle according to claim 18, wherein said closed section is formed by:

a front hood ridge reinforcement at a front side of said hood ridge reinforcement (1); and a cowl top panel at a lateral side to said cowl top panel.

20. A drain structure in a front body of a vehicle according to claim 18, wherein a drain opening is formed at a front end of said closed section.

* * * * *